(12) United States Patent
DeVries et al.

(10) Patent No.: US 9,781,007 B2
(45) Date of Patent: *Oct. 3, 2017

(54) OPPORTUNISTIC BLOCK TRANSMISSION WITH TIME CONSTRAINTS

(71) Applicant: Numecent Holdings, Inc., Irvine, CA (US)

(72) Inventors: Jeffrey DeVries, Sunnyvale, CA (US); Arthur S. Hitomi, Huntington Beach, CA (US)

(73) Assignee: Numecent Holdings, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,286

(22) Filed: Mar. 8, 2016

(65) Prior Publication Data

US 2016/0191323 A1 Jun. 30, 2016

Related U.S. Application Data

(63) Continuation of application No. 14/553,873, filed on Nov. 25, 2014, now Pat. No. 9,300,752, which is a
(Continued)

(51) Int. Cl.
| | |
|---|---|
| *G06F 12/08* | (2016.01) |
| *H04L 12/24* | (2006.01) |
| *G06F 12/0862* | (2016.01) |
| *H04L 29/06* | (2006.01) |
| *H04L 29/08* | (2006.01) |

(Continued)

(52) U.S. Cl.
CPC ...... *H04L 41/0896* (2013.01); *G06F 12/0862* (2013.01); *H04L 65/4084* (2013.01); *H04L 65/607* (2013.01); *H04L 67/2847* (2013.01); *G06F 12/0802* (2013.01); *G06F 12/0864* (2013.01); *G06F 13/1673* (2013.01)

(58) Field of Classification Search
None
See application file for complete search history.

(56) References Cited

U.S. PATENT DOCUMENTS

| | | | |
|---|---|---|---|
| 4,562,306 | A | 12/1985 | Chuo et al. |
| 4,796,220 | A | 1/1989 | Wolfe |

(Continued)

FOREIGN PATENT DOCUMENTS

| | | |
|---|---|---|
| EP | 0813325 | 12/1997 |
| EP | 0658837 | 6/2000 |

(Continued)

OTHER PUBLICATIONS

Chang K et al, Dynamic Computation of TCP Maximum Window Size for Directly connected Hosts, IBM Technical Disclosure Bulletin, Apr. 1994; pp. 601-607.*
(Continued)

*Primary Examiner* — Duc Doan
(74) *Attorney, Agent, or Firm* — Sheppard, Mullin, Richter & Hampton LLP

(57) ABSTRACT

A technique for determining a data window size allows a set of predicted blocks to be transmitted along with requested blocks. A stream enabled application executing in a virtual execution environment may use the blocks when needed.

18 Claims, 9 Drawing Sheets

Related U.S. Application Data continuation of application No. 13/962,554, filed on Aug. 8, 2013, now Pat. No. 8,898,391, which is a continuation of application No. 13/234,950, filed on Sep. 16, 2011, now Pat. No. 8,527,706, which is a continuation of application No. 12/062,789, filed on Apr. 4, 2008, now Pat. No. 8,024,523, and a continuation-in-part of application No. 11/388,381, filed on Mar. 23, 2006.

(60) Provisional application No. 60/986,261, filed on Nov. 7, 2007, provisional application No. 60/664,765, filed on Mar. 23, 2005.

(51) Int. Cl.
G06F 13/16 (2006.01)
G06F 12/0864 (2016.01)
G06F 12/0802 (2016.01)

(56) References Cited

U.S. PATENT DOCUMENTS

| | | |
|---|---|---|
| 4,949,257 A | 8/1990 | Orbach |
| 4,970,504 A | 11/1990 | Chen |
| 4,999,806 A | 3/1991 | Chernow et al. |
| 5,012,512 A | 4/1991 | Basso et al. |
| 5,032,979 A | 7/1991 | Hecht et al. |
| 5,047,928 A | 9/1991 | Wiedemer |
| 5,063,500 A | 11/1991 | Shorter |
| 5,109,413 A | 4/1992 | Comeford et al. |
| 5,166,886 A | 11/1992 | Molnar et al. |
| 5,210,850 A | 5/1993 | Kelly et al. |
| 5,293,556 A | 3/1994 | Hill et al. |
| 5,311,596 A | 5/1994 | Scott et al. |
| 5,325,489 A | 6/1994 | Mitsuhira et al. |
| 5,442,791 A | 8/1995 | Wrabetz et al. |
| 5,481,611 A | 1/1996 | Owens et al. |
| 5,495,411 A | 2/1996 | Ananda |
| 5,533,123 A | 7/1996 | Force et al. |
| 5,537,566 A | 7/1996 | Konno et al. |
| 5,544,321 A | 8/1996 | Theimer et al. |
| 5,546,526 A | 8/1996 | Li et al. |
| 5,547,202 A | 8/1996 | Tsumura |
| 5,548,645 A | 8/1996 | Ananda |
| 5,553,139 A | 9/1996 | Ross et al. |
| 5,553,143 A | 9/1996 | Ross et al. |
| 5,555,376 A | 9/1996 | Theimer et al. |
| 5,611,050 A | 3/1997 | Theimer et al. |
| 5,629,980 A | 5/1997 | Stefik et al. |
| 5,630,049 A | 5/1997 | Cardoza et al. |
| 5,635,906 A | 6/1997 | Joseph |
| 5,638,513 A | 6/1997 | Ananda |
| 5,652,887 A | 7/1997 | Dewey et al. |
| 5,666,293 A | 9/1997 | Metz et al. |
| 5,696,965 A | 12/1997 | Dedrick |
| 5,701,427 A | 12/1997 | Lathrop |
| 5,706,440 A | 1/1998 | Compliment et al. |
| 5,715,403 A | 2/1998 | Stefik |
| 5,758,150 A | 5/1998 | Bell et al. |
| 5,761,445 A | 6/1998 | Nguyen |
| 5,764,906 A | 6/1998 | Edelstein et al. |
| 5,764,918 A | 6/1998 | Poulter |
| 5,765,152 A | 6/1998 | Erickson |
| 5,765,153 A | 6/1998 | Benantar et al. |
| 5,768,528 A | 6/1998 | Stumm |
| 5,768,539 A | 6/1998 | Metz et al. |
| 5,771,354 A | 6/1998 | Crawford |
| 5,778,395 A | 7/1998 | Whiting et al. |
| 5,790,753 A | 8/1998 | Krishnamoorthy et al. |
| 5,805,809 A | 9/1998 | Singh et al. |
| 5,809,144 A | 9/1998 | Sirbu et al. |
| 5,812,865 A | 9/1998 | Theimer et al. |
| 5,812,881 A | 9/1998 | Ku et al. |
| 5,815,662 A | 9/1998 | Ong |
| 5,818,711 A | 10/1998 | Schwabe et al. |
| 5,822,537 A | 10/1998 | Katseff et al. |
| 5,832,289 A | 11/1998 | Shaw et al. |
| 5,835,722 A | 11/1998 | Bradshaw et al. |
| 5,838,910 A | 11/1998 | Domenikos et al. |
| 5,839,910 A | 11/1998 | Meller et al. |
| 5,855,020 A | 12/1998 | Kirsch |
| 5,874,986 A | 2/1999 | Gibbon et al. |
| 5,878,425 A | 3/1999 | Redpath |
| 5,881,229 A | 3/1999 | Singh et al. |
| 5,881,232 A | 3/1999 | Cheng et al. |
| 5,892,915 A | 4/1999 | Duso et al. |
| 5,892,953 A | 4/1999 | Bhagria et al. |
| 5,895,454 A | 4/1999 | Harrington |
| 5,895,471 A | 4/1999 | King et al. |
| 5,901,315 A | 5/1999 | Edwards et al. |
| 5,903,721 A | 5/1999 | Sixtus |
| 5,903,732 A | 5/1999 | Reed et al. |
| 5,903,892 A | 5/1999 | Hoffert et al. |
| 5,905,868 A | 5/1999 | Baghai et al. |
| 5,905,990 A | 5/1999 | Inglett |
| 5,909,545 A | 6/1999 | Frese et al. |
| 5,911,043 A | 6/1999 | Duffy et al. |
| 5,918,015 A | 6/1999 | Suzuki et al. |
| 5,923,885 A | 7/1999 | Johnson |
| 5,925,126 A | 7/1999 | Hsieh et al. |
| 5,926,552 A | 7/1999 | Mckeon |
| 5,929,849 A | 7/1999 | Kikinis |
| 5,931,907 A | 8/1999 | Davies et al. |
| 5,933,603 A | 8/1999 | Vahalia et al. |
| 5,933,822 A | 8/1999 | Braden-Harder et al. |
| 5,940,591 A | 8/1999 | Boyle et al. |
| 5,943,424 A | 8/1999 | Berger et al. |
| 5,948,062 A | 9/1999 | Tzelnic et al. |
| 5,948,065 A | 9/1999 | Eilert et al. |
| 5,949,877 A | 9/1999 | Traw et al. |
| 5,950,195 A | 9/1999 | Stockwell et al. |
| 5,953,506 A | 9/1999 | Kalra et al. |
| 5,956,717 A | 9/1999 | Kraay et al. |
| 5,960,411 A | 9/1999 | Hartman et al. |
| 5,960,439 A | 9/1999 | Hamner et al. |
| 5,961,586 A | 10/1999 | Pedersen |
| 5,961,591 A | 10/1999 | Jones et al. |
| 5,963,444 A | 10/1999 | Shidara et al. |
| 5,963,944 A | 10/1999 | Adams |
| 5,968,176 A | 10/1999 | Nessett et al. |
| 5,973,696 A | 10/1999 | Arganat et al. |
| 5,987,454 A | 11/1999 | Hobbs |
| 5,987,608 A | 11/1999 | Roskind |
| 6,003,065 A | 12/1999 | Yan et al. |
| 6,003,095 A | 12/1999 | Pekowski et al. |
| 6,014,686 A | 1/2000 | Elnozahy et al. |
| 6,018,619 A | 1/2000 | Allard et al. |
| 6,026,166 A | 2/2000 | LeBourgeois |
| 6,028,925 A | 2/2000 | Van Berkum et al. |
| 6,038,379 A | 3/2000 | Fletcher et al. |
| 6,038,610 A | 3/2000 | Belfiore et al. |
| 6,047,323 A | 4/2000 | Krause |
| 6,049,792 A | 4/2000 | Hart et al. |
| 6,049,835 A | 4/2000 | Gagnon |
| 6,061,738 A | 5/2000 | Osaku et al. |
| 6,065,043 A | 5/2000 | Domenikos et al. |
| 6,076,104 A | 6/2000 | McCue |
| 6,081,842 A | 6/2000 | Shachar et al. |
| 6,085,186 A | 7/2000 | Christianson et al. |
| 6,085,193 A | 7/2000 | Malkin et al. |
| 6,088,705 A | 7/2000 | Lightstone |
| 6,092,194 A | 7/2000 | Touboul |
| 6,094,649 A | 7/2000 | Bowen et al. |
| 6,098,072 A | 8/2000 | Sluiman et al. |
| 6,099,408 A | 8/2000 | Schneier et al. |
| 6,101,482 A | 8/2000 | DiAngelo et al. |
| 6,101,491 A | 8/2000 | Woods |
| 6,101,537 A | 8/2000 | Edelstein et al. |
| 6,108,420 A | 8/2000 | Larose et al. |
| 6,115,741 A | 9/2000 | Domenikos et al. |
| 6,138,271 A | 10/2000 | Keeley |
| 6,154,878 A | 11/2000 | Saboff |
| 6,157,948 A | 12/2000 | Inoue et al. |

(56) References Cited

U.S. PATENT DOCUMENTS

| | | | |
|---|---|---|---|
| 6,167,510 A | 12/2000 | Tran | |
| 6,167,522 A | 12/2000 | Lee et al. | |
| 6,173,311 B1 | 1/2001 | Hassett et al. | |
| 6,173,330 B1 | 1/2001 | Guo et al. | |
| 6,185,608 B1 | 2/2001 | Hon et al. | |
| 6,192,398 B1 | 2/2001 | Hunt | |
| 6,192,408 B1 | 2/2001 | Vahalia et al. | |
| 6,195,694 B1 | 2/2001 | Chen et al. | |
| 6,212,640 B1 | 4/2001 | Abdelnur et al. | |
| 6,219,693 B1 | 4/2001 | Napolitano et al. | |
| 6,226,412 B1 | 5/2001 | Schwab | |
| 6,226,665 B1 | 5/2001 | Deo et al. | |
| 6,253,234 B1 | 6/2001 | Hunt et al. | |
| 6,275,470 B1 | 8/2001 | Ricciulli | |
| 6,275,496 B1 | 8/2001 | Burns et al. | |
| 6,278,992 B1 | 8/2001 | Curtis et al. | |
| 6,281,898 B1 | 8/2001 | Nikolovska et al. | |
| 6,282,712 B1 | 8/2001 | Davis et al. | |
| 6,298,356 B1 | 10/2001 | Jawahar et al. | |
| 6,301,584 B1 | 10/2001 | Ranger | |
| 6,301,605 B1 | 10/2001 | Napolitano et al. | |
| 6,301,629 B1 | 10/2001 | Sastri et al. | |
| 6,301,685 B1 | 10/2001 | Shigeta | |
| 6,311,221 B1 | 10/2001 | Raz et al. | |
| 6,314,425 B1 | 11/2001 | Serbinis et al. | |
| 6,321,260 B1 | 11/2001 | Takeuchi et al. | |
| 6,330,561 B1 | 12/2001 | Cohen et al. | |
| 6,343,287 B1 | 1/2002 | Kumar et al. | |
| 6,347,398 B1 | 2/2002 | Parthasarathy et al. | |
| 6,356,946 B1 | 3/2002 | Clegg et al. | |
| 6,369,467 B1 | 4/2002 | Noro | |
| 6,370,686 B1 | 4/2002 | Delo et al. | |
| 6,374,402 B1 | 4/2002 | Schmeidler et al. | |
| 6,385,696 B1 | 5/2002 | Doweck et al. | |
| 6,389,467 B1 | 5/2002 | Eyal | |
| 6,418,554 B1 | 7/2002 | Delo et al. | |
| 6,418,555 B2 | 7/2002 | Mohammed | |
| 6,418,556 B1 | 7/2002 | Bennington et al. | |
| 6,424,991 B1 | 7/2002 | Gish | |
| 6,425,017 B1 | 7/2002 | Dievendorff et al. | |
| 6,449,688 B1 | 9/2002 | Peters et al. | |
| 6,453,334 B1 | 9/2002 | Vinson et al. | |
| 6,457,076 B1 | 9/2002 | Cheng et al. | |
| 6,508,709 B1 | 1/2003 | Karmarkar | |
| 6,510,458 B1 | 1/2003 | Berstis et al. | |
| 6,510,462 B2 | 1/2003 | Blumenau | |
| 6,510,466 B1 | 1/2003 | Cox et al. | |
| 6,524,017 B2 | 2/2003 | Lecocq et al. | |
| 6,574,618 B2 | 6/2003 | Eylon et al. | |
| 6,584,507 B1 | 6/2003 | Bradley et al. | |
| 6,587,857 B1 | 7/2003 | Carothers et al. | |
| 6,594,682 B2 | 7/2003 | Peterson et al. | |
| 6,598,125 B2 | 7/2003 | Romm | |
| 6,601,103 B1 | 7/2003 | Goldschmidt Iki et al. | |
| 6,601,110 B2 | 7/2003 | Marsland | |
| 6,605,956 B2 | 8/2003 | Farnworth et al. | |
| 6,609,114 B1 | 8/2003 | Gressel et al. | |
| 6,611,812 B2 | 8/2003 | Hurtado et al. | |
| 6,622,137 B1 | 9/2003 | Ravid et al. | |
| 6,622,171 B2 | 9/2003 | Gupta et al. | |
| 6,636,961 B1 | 10/2003 | Braun et al. | |
| 6,651,251 B1 | 11/2003 | Shoff et al. | |
| 6,687,745 B1 | 2/2004 | Franco et al. | |
| 6,694,510 B1 | 2/2004 | Willems | |
| 6,697,869 B1 | 2/2004 | Mallart et al. | |
| 6,711,619 B1 | 3/2004 | Chandramohan et al. | |
| 6,721,870 B1 * | 4/2004 | Yochai | G06F 3/0611 711/112 |
| 6,732,179 B1 | 5/2004 | Brown et al. | |
| 6,735,631 B1 | 5/2004 | Oehrke et al. | |
| 6,757,708 B1 | 6/2004 | Craig et al. | |
| 6,757,894 B2 | 6/2004 | Eylon et al. | |
| 6,763,370 B1 | 7/2004 | Schmeidler et al. | |
| 6,772,209 B1 | 8/2004 | Chernock et al. | |
| 6,775,779 B1 | 8/2004 | England et al. | |
| 6,779,179 B1 | 8/2004 | Romm et al. | |
| 6,785,768 B2 | 8/2004 | Peters et al. | |
| 6,785,865 B1 | 8/2004 | Cote et al. | |
| 6,801,507 B1 | 10/2004 | Humpleman et al. | |
| 6,810,525 B1 | 10/2004 | Safadi et al. | |
| 6,816,909 B1 | 11/2004 | Chang et al. | |
| 6,816,950 B2 | 11/2004 | Nichols | |
| 6,832,222 B1 | 12/2004 | Zimowski | |
| 6,836,794 B1 | 12/2004 | Lucowsky et al. | |
| 6,854,009 B1 | 2/2005 | Hughes | |
| 6,891,740 B2 | 5/2005 | Williams | |
| 6,918,113 B2 | 7/2005 | Patel et al. | |
| 6,925,495 B2 | 8/2005 | Hedge et al. | |
| 6,938,096 B1 | 8/2005 | Greschler et al. | |
| 6,959,320 B2 | 10/2005 | Shah et al. | |
| 6,970,866 B1 | 11/2005 | Pravetz et al. | |
| 6,985,915 B2 | 1/2006 | Somalwar et al. | |
| 7,024,677 B1 | 4/2006 | Snyder et al. | |
| 7,028,305 B2 | 4/2006 | Schaefer et al. | |
| 7,043,524 B2 | 5/2006 | Shah et al. | |
| 7,047,312 B1 | 5/2006 | Aweya et al. | |
| 7,051,315 B2 | 5/2006 | Artzi et al. | |
| 7,062,567 B2 | 6/2006 | Benitez et al. | |
| 7,093,077 B2 | 8/2006 | Cooksey et al. | |
| 7,096,253 B2 | 8/2006 | Vinson et al. | |
| 7,112,138 B2 | 9/2006 | Hendrick et al. | |
| 7,130,616 B2 | 10/2006 | Janik | |
| 7,137,072 B2 | 11/2006 | Bauer et al. | |
| 7,171,390 B1 | 1/2007 | Song et al. | |
| 7,191,441 B2 | 3/2007 | Abbott et al. | |
| 7,192,352 B2 | 3/2007 | Walker et al. | |
| 7,197,516 B1 | 3/2007 | Hipp et al. | |
| 7,246,119 B2 | 7/2007 | Kuwata et al. | |
| 7,380,014 B2 | 5/2008 | Lecroy et al. | |
| 7,451,196 B1 | 11/2008 | de Vries et al. | |
| 7,711,539 B1 | 5/2010 | Kimmel et al. | |
| 2001/0003828 A1 | 6/2001 | Peterson et al. | |
| 2001/0014878 A1 | 8/2001 | Mitra et al. | |
| 2001/0027493 A1 | 10/2001 | Wallace | |
| 2001/0034736 A1 * | 10/2001 | Eylon | G06F 17/30067 |
| 2001/0037399 A1 | 11/2001 | Eylon et al. | |
| 2001/0037400 A1 | 11/2001 | Raz et al. | |
| 2001/0042833 A1 | 11/2001 | Kenway | |
| 2001/0044850 A1 | 11/2001 | Raz et al. | |
| 2001/0044851 A1 | 11/2001 | Rothman et al. | |
| 2002/0015106 A1 | 2/2002 | Taylor, Jr. | |
| 2002/0019864 A1 | 2/2002 | Mayer | |
| 2002/0027884 A1 * | 3/2002 | Halme | H04L 12/2602 370/253 |
| 2002/0035674 A1 | 3/2002 | Vetrivelkumaran et al. | |
| 2002/0038374 A1 | 3/2002 | Gupta et al. | |
| 2002/0042833 A1 | 4/2002 | Hendler et al. | |
| 2002/0057893 A1 | 5/2002 | Wood et al. | |
| 2002/0059402 A1 | 5/2002 | Belanger | |
| 2002/0065848 A1 | 5/2002 | Walker et al. | |
| 2002/0078170 A1 | 6/2002 | Brewer et al. | |
| 2002/0078203 A1 | 6/2002 | Greschler et al. | |
| 2002/0083183 A1 | 6/2002 | Pujare et al. | |
| 2002/0083187 A1 | 6/2002 | Sim et al. | |
| 2002/0087717 A1 | 7/2002 | Artzi et al. | |
| 2002/0087883 A1 | 7/2002 | Wohlgemuth et al. | |
| 2002/0087963 A1 | 7/2002 | Eylon et al. | |
| 2002/0091763 A1 | 7/2002 | Shah et al. | |
| 2002/0091901 A1 | 7/2002 | Romm | |
| 2002/0116476 A1 | 8/2002 | Eyal et al. | |
| 2002/0133491 A1 | 9/2002 | Sim et al. | |
| 2002/0138640 A1 | 9/2002 | Raz et al. | |
| 2002/0147849 A1 | 10/2002 | Wong et al. | |
| 2002/0156911 A1 | 10/2002 | Croman et al. | |
| 2002/0157089 A1 | 10/2002 | Patel et al. | |
| 2002/0161908 A1 | 10/2002 | Benitez et al. | |
| 2002/0174215 A1 | 11/2002 | Schaefer | |
| 2002/0176443 A1 * | 11/2002 | Wei | H04L 47/10 370/468 |
| 2003/0004882 A1 | 1/2003 | Holler et al. | |
| 2003/0009538 A1 | 1/2003 | Shah et al. | |
| 2003/0056112 A1 | 3/2003 | Vinson et al. | |
| 2003/0105816 A1 | 6/2003 | Goswami | |
| 2003/0128692 A1 | 7/2003 | Mitsumori et al. | |

(56) References Cited

U.S. PATENT DOCUMENTS

| | | |
|---|---|---|
| 2003/0138024 A1 | 7/2003 | Williamson et al. |
| 2003/0140160 A1 | 7/2003 | Raz et al. |
| 2003/0204550 A1* | 10/2003 | Lutter .................... G01S 19/37 718/102 |
| 2004/0003105 A1* | 1/2004 | Berzosa ................. H04L 29/06 709/232 |
| 2004/0036722 A1 | 2/2004 | Warren |
| 2004/0128342 A1 | 7/2004 | Maes et al. |
| 2004/0133657 A1 | 7/2004 | Smith et al. |
| 2004/0199566 A1 | 10/2004 | Carlson et al. |
| 2004/0230784 A1 | 11/2004 | Cohen |
| 2004/0230971 A1 | 11/2004 | Rachman et al. |
| 2004/0267813 A1 | 12/2004 | Rivers-Moore et al. |
| 2004/0268361 A1 | 12/2004 | Schaefer |
| 2005/0010607 A1 | 1/2005 | Parker et al. |
| 2005/0010670 A1 | 1/2005 | Greschler et al. |
| 2005/0041584 A1 | 2/2005 | Lau et al. |
| 2005/0091534 A1 | 4/2005 | Nave et al. |
| 2005/0114472 A1 | 5/2005 | Tan |
| 2005/0193139 A1 | 9/2005 | Vinson et al. |
| 2005/0278642 A1* | 12/2005 | Chang .................... G06Q 10/06 715/751 |
| 2005/0289617 A1 | 12/2005 | Safadi et al. |
| 2006/0010074 A1 | 1/2006 | Zeitsiff et al. |
| 2006/0031165 A1 | 2/2006 | Nave et al. |
| 2006/0047716 A1 | 3/2006 | Keith, Jr. |
| 2006/0048136 A1 | 3/2006 | de Vries et al. |
| 2006/0062112 A1* | 3/2006 | Wijnands ............... G11B 19/02 369/47.5 |
| 2006/0106770 A1 | 5/2006 | de Vries |
| 2006/0123185 A1 | 6/2006 | de Vries et al. |
| 2006/0136389 A1 | 6/2006 | Cover et al. |
| 2006/0168294 A1 | 7/2006 | de Vries et al. |
| 2006/0218165 A1 | 9/2006 | de Vries et al. |
| 2006/0230175 A1 | 10/2006 | de Vries |
| 2007/0038642 A1 | 2/2007 | Durgin et al. |
| 2007/0043550 A1 | 2/2007 | Tzruya |
| 2007/0067435 A1 | 3/2007 | Landis et al. |
| 2007/0074223 A1 | 3/2007 | Lescouet et al. |
| 2007/0126749 A1 | 6/2007 | Tzruya et al. |
| 2007/0129146 A1 | 6/2007 | Tzruya et al. |
| 2007/0129990 A1 | 6/2007 | Tzruya et al. |
| 2007/0130075 A1 | 6/2007 | Song et al. |
| 2007/0130292 A1 | 6/2007 | Tzruyz et al. |
| 2007/0168309 A1 | 7/2007 | Tzruya et al. |
| 2007/0196074 A1 | 8/2007 | Jennings et al. |
| 2008/0178298 A1 | 7/2008 | Arai et al. |
| 2009/0119458 A1 | 5/2009 | de Vries et al. |
| 2009/0119644 A1 | 5/2009 | de Vries et al. |
| 2010/0023640 A1 | 1/2010 | Vinson et al. |

FOREIGN PATENT DOCUMENTS

| | | |
|---|---|---|
| EP | 1020824 | 7/2000 |
| EP | 1143349 | 10/2001 |
| WO | 9840993 | 9/1998 |
| WO | 9850853 | 11/1998 |
| WO | 9957863 | 11/1999 |
| WO | 9960458 | 11/1999 |
| WO | 0004681 | 1/2000 |
| WO | 0031657 | 6/2000 |
| WO | 0031672 | 6/2000 |
| WO | 0056028 | 9/2000 |
| WO | 0127805 | 4/2001 |
| WO | 0146856 | 6/2001 |
| WO | 0244840 | 6/2002 |
| WO | 2006022745 | 3/2006 |
| WO | 2006047133 | 5/2006 |
| WO | 2006055445 | 5/2006 |
| WO | 2006102532 | 9/2006 |
| WO | 2006102621 | 9/2006 |

OTHER PUBLICATIONS

Bailey, Peter et al., "Chart of Darkness: Mapping a Large Intranet," Dept. of Computer Science, FEIT, The Australian National University, Canberra ACT 0200, Australia, pp. 1-23, Nov. 11, 1999 [retrieved online at http://research.microsoft.com/en-us/um/people/nickcr/pubs/bailey_tr00.pdf].

Boneh, Dan et al., "An Attack on RSA Given a Small Fraction of the Private Key Bits," Advances in Cryptology—Asiacrypt '98, Lecture Notes in Computer Science, vol. 1514, pp. 25-34, Oct. 1998 [retrieved online at http://download.springer.com/static/pdf/450/chp%253A10.1007%252F3-540-49649-1_3.pdf?auth66=1394831295_318c7a44939193b5a2aff612b2a047ac&ext=.pdf].

Brin, Sergey et al., "The Anatomy of a Large-Scale Hypertextual Web Search Engine," Proceedings of the Seventh International World Wide Web Conference, pp. 107-117, Apr. 1998 [retrieved online at http://ilpubs.stanford.edu:8090/361/1/1998-8.pdf].

Chu, Yang-Hua et al., "Referee: Trust Management for Web Applications," Proceedings of the Sixth International World Wide Web Conference, 1997, retrieved online on Jun. 15, 2006 at http://www.si.umich.edu/~presnick/papers/Referee/www6-referee.html.

Faupel, Matthew, "Status of Industry Work on Signed Mobile Code," Joint European Networking Conference (JENC), May 1997, 313-1-313-8.

Fiedler, David et al., "UNIX System V. Release 4 Administration," Second Edition, 1991, 1-13, 37-116, 152-153, 175-200, 291-312, Hayden Books, Carmel, Indiana, USA.

George, Binto et al., "Secure Transaction Processing in Firm Real-Time Database Systems," SIGMOD International Conference on Management of Data 1997, 462-473, V26, Issue 2, Association of Computing Machinery (ACM) Press, Tucson, Arizona, United States, May 13, 1997.

Gralla, Preston, "How the Internet Works: Chapter 44—Shopping on the Internet," IEEE Personal communications, Aug. 1999, 260-67, QUE—A division of Macmillan Computer Publishing, Millennium Edition.

Microsoft Corp., "Computer Dictionary," 3rd edition, 1997, pp. 119 & 305, Microsoft Press.

Microsoft Corp., "Understanding Universal Plug and Play," pp. 1-39, Feb. 2000.

Morrow, Brian et al., "Indexing Within—The Lost Gold Within the Enterprise" Endeavors Technology, Aug. 22, 2000, pp. 1-6.

Mullender, Sape J. et al., "Amoeba: A Distributed Operating System for the 1990's," Computer Magazine, May 1990, 44-53, 23(5).

Nakayoshi et al., "A Secure Private File System with Minimal System Administration," Communications, Computers and Signal Processing, 1997 IEEE Pacific Rim Conference, 251-255, vol. 1.

O'Mahony, Donal, "Security Considerations in a Network Management Environment," 1994, 12-17, vol. 8, IEEE, USA.

Pyarali, Irfan et al., "Design and Performance of an Object-Oriented Framework for High-Speed Electronic Medical Imaging," Fall 1996, Computing Systems Journal, 331-375, vol. 9, http://www.cs.wustl.edu/~schmidt/PDF/COOTS-96.pdf.

Rappaport, Avi, "Robots & Spiders & Crawlers: How Web and Intranet Search Engines Follow Links to Build Indexes," Infoseek Software, pp. 1-38 (Oct. 1999).

Reinhardt, Robert B., "An Architectural Overview of UNIX Network Security," ARINC Research Corporation, Sep. 19, 1992, retrieved online on Jun. 15, 2006 at http://www.clusit.it/whitepapers/unixnet.pdf.

Sirbu, Marvin et al., "Netbill: An Internet Commerce System Optimized for Network-Delivered Services," IEEE Personal Communications, 2(4):34-39, Aug. 1995.

Tardo, Joseph et al., "Mobile Agent Security and Telescript," 4th International Conference of the IEEE Computer Society (IEEE CompCon1996), Feb. 1996.

International Application No. PCT/US2004/028195, Search Report and Written Opinion dated May 2, 2006.

(56) References Cited

OTHER PUBLICATIONS

International Application No. PCT/US2005/041024, Search Report and Written Opinion dated Feb. 27, 2007.
International Application No. PCT/US2006/010637, Search Report and Written Opinion dated Sep. 25, 2007.
International Application No. PCT/US2006/010904, Search Report and Written Opinion dated Dec. 26, 2007.
U.S. Appl. No. 09/996,180, filed Nov. 27, 2001.

* cited by examiner

800A →

|   | 7 | 8 | 9 | 10 | 11 | 12 | 13 |
|---|---|---|---|---|---|---|---|
| 7 | 0 | .50 | 0 | 0 | .10 | 0 | .40 |
| 8 | 0 | 0 | 0 | 0 | 0 | 0 | 1.00 |
| 9 | .10 | 0 | .90 | 0 | 0 | 0 | 0 |
| 10 | 0 | 0 | 0 | 0 | 0 | 0 | 0 |
| 11 | 0 | .40 | 0 | .30 | 0 | .30 | 0 |
| 12 | 0 | 0 | 0 | 0 | 0 | 0 | 0 |
| 13 | .80 | 0 | 0 | 0 | .10 | .10 | 0 | requested block (rows 7–13)

predicted block (columns 7–13)

800B →

| 7, 13, 12 |

FIG. 8

OPPORTUNISTIC BLOCK TRANSMISSION WITH TIME CONSTRAINTS

CROSS REFERENCE TO RELATED APPLICATIONS

This application is a continuation application of U.S. patent application Ser. No. 14/553,873, filed Nov. 25, 2014, entitled "OPPORTUNISTIC BLOCK TRANSMISSION WITH TIME CONSTRAINTS," which is a continuation application of U.S. patent application Ser. No. 13/962,554, filed Aug. 8, 2013, entitled "OPPORTUNISTIC BLOCK TRANSMISSION WITH TIME CONSTRAINTS," now U.S. Pat. No. 8,898,391, which is a continuation application of U.S. patent application Ser. No. 13/234,950 filed Sep. 16, 2011, entitled "OPPORTUNISTIC BLOCK TRANSMISSION WITH TIME CONSTRAINTS," now U.S. Pat. No. 8,527,706, which is a continuation application of U.S. patent application Ser. No. 12/062,789, filed Apr. 4, 2008 entitled "OPPORTUNISTIC BLOCK TRANSMISSION WITH TIME CONSTRAINTS," now U.S. Pat. No. 8,024,523, which claims priority to U.S. Provisional Patent Application No. 60/986,261 filed Nov. 7, 2007 entitled "OPPORTUNISTIC BLOCK TRANSMISSION WITH TIME CONSTRAINTS," all of which are incorporated herein by reference. The U.S. patent application Ser. No. 13/234,950 is also a continuation-in-part of U.S. patent application Ser. No. 11/388,381 filed Mar. 23, 2006 entitled "SYSTEM AND METHOD FOR TRACKING CHANGES TO FILES IN STREAMING APPLICATIONS," which claims priority to U.S. Provisional Patent Application No. 60/664,765 filed on Mar. 23, 2005 entitled "SYSTEM AND METHOD FOR TRACKING CHANGES TO FILES IN STREAMING APPLICATIONS," all of which are incorporated herein by reference.

BACKGROUND

In requesting and receiving blocks of a stream enabled application, some blocks may be predicted as needed following other blocks. When blocks are predicted, there may be uncertainty as to how many predicted blocks to transmit. This may relate to an amount of data to be transmitted. If too many blocks are sent then a delay perceived by a user is increased, and/or network bandwidth is wasted, which may be expensive to a streaming service provider. If too few blocks are sent then bandwidth of a network connection may be underutilized. If a system refrains from transmitting blocks until a user actually requests them then the system must transmit the requested blocks while the user waits, expending the user's valuable time. In many cases users may desire to eliminate such waiting time.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above described problems have been reduced or eliminated, while other embodiments are directed to other improvements.

A technique for determining a data window size allows a set of predicted blocks to be transmitted using surplus bandwidth. Advantageously, predicted blocks are transmitted to a streaming playback device before the device needs the blocks. A stream enabled application executing in a virtual execution environment may use the blocks when needed without having to wait for their transmission, limiting user delays.

A system based on the technique may include a streaming playback device and a streaming server. The streaming server may provide the streaming playback device blocks that it will need prior to the blocks actually being requested. The streaming playback device may cache necessary blocks and then use them when needed. A caching system may request only those blocks that are not found in cache when requests for blocks include some but not all of the blocks in the cache.

BRIEF DESCRIPTION

FIG. 8 depicts a diagram of an example of a logical expression of a block probability table and a diagram of an example of partially filled response buffer.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
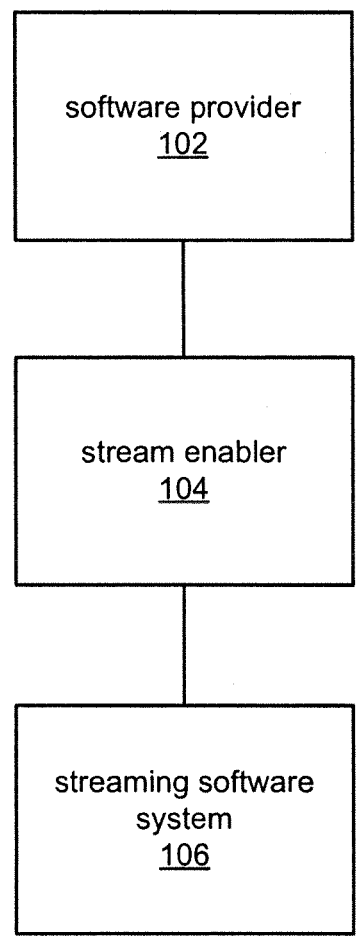
FIG. 1 depicts a diagram of an example of a system for streaming software.

FIG. 1 depicts a diagram 100 of an example of a system for streaming software. FIG. 1 includes software provider 102, stream enabler 104, and opportunistic streaming software system 106.

In the example of FIG. 1, software provider 102 supplies a software application. The software application may be provided as deliverables such as data, executable code, and libraries. The application may be provided by way of CD-ROM, DVD-ROM, download over a network, from an input/output (I/O) device, or via any known or convenient mechanism.

Resources, e.g. data, executable code, may be included in the deliverables supplied by the software provider 102. An application executing in a virtual execution environment may request resources, and it may be necessary to transmit blocks including resources to a streaming playback device for satisfaction of the resource request. A user may be required to wait while blocks including resources are transmitted to a streaming playback device.

The software application may have an interactive threshold. The interactive threshold may be an amount of time that a user is willing to wait for a system to access resources. In a non-limiting example, the interactivity threshold may be approximately 1/10 of a second because a 1/10 of a second delay is noticeable to a human being, and delays of greater than 1/10 of a second may decrease user satisfaction with the software. The interactivity threshold may be supplied by the software provider 102, may be determined through trial and error, may be determined by systematically executing the software application many times and averaging user responses, may be set to a default value (e.g. 1/10 of a second) or may be acquired by any method known or convenient.

In the example of FIG. 1, stream enabler 104 prepares the non-stream enabled software application provided by software provided 102 to be streamed. The stream enabler 104 breaks the non-stream enabled software application into blocks of an optimal block size. The optimal block size may be small so as to allow for aggregation of blocks with fine granularity. The optimal block size may be narrowed to a range, e.g. 512 bytes-32 k bytes. In some cases the optimal block size may be larger or smaller than the specified range and may be any size known or convenient. A deliverable is broken up into many pieces. Each of the pieces may be of the optimal block size, or the pieces may have a variable block size, all of which are the optimal block size or smaller. In some cases, it may even be desirable to increase block size to greater than the optimal block size. In a non-limiting example, the optimal block size is set to 4 kb and the non-stream enabled software application is broken up into blocks of a stream-enabled application each up to 4 kb in size, most being of 4 kb. An optimal size of 4 k may have certain advantages because that is also the page size of many computer systems. This can improve memory allocation efficiency, improve simplicity, and/or have other advantages.

In the example of FIG. 1, opportunistic streaming software system 106 may include a streaming software server and a streaming software playback device. A server may be either hardware or software or may be a combination of both hardware software, and firmware. The server may include blocks of the stream-enabled application. The server may be coupled to the streaming software playback device via a network. The network may have throughput and latency characteristics. The throughput and latency characteristics may be dynamically changing.

Alternatively, in lieu of or in addition to a server, an I/O device that includes at last some blocks of the stream enabled application could be used. In this case, the I/O interface may have relevant throughput and latency characteristics.

Figure 2:
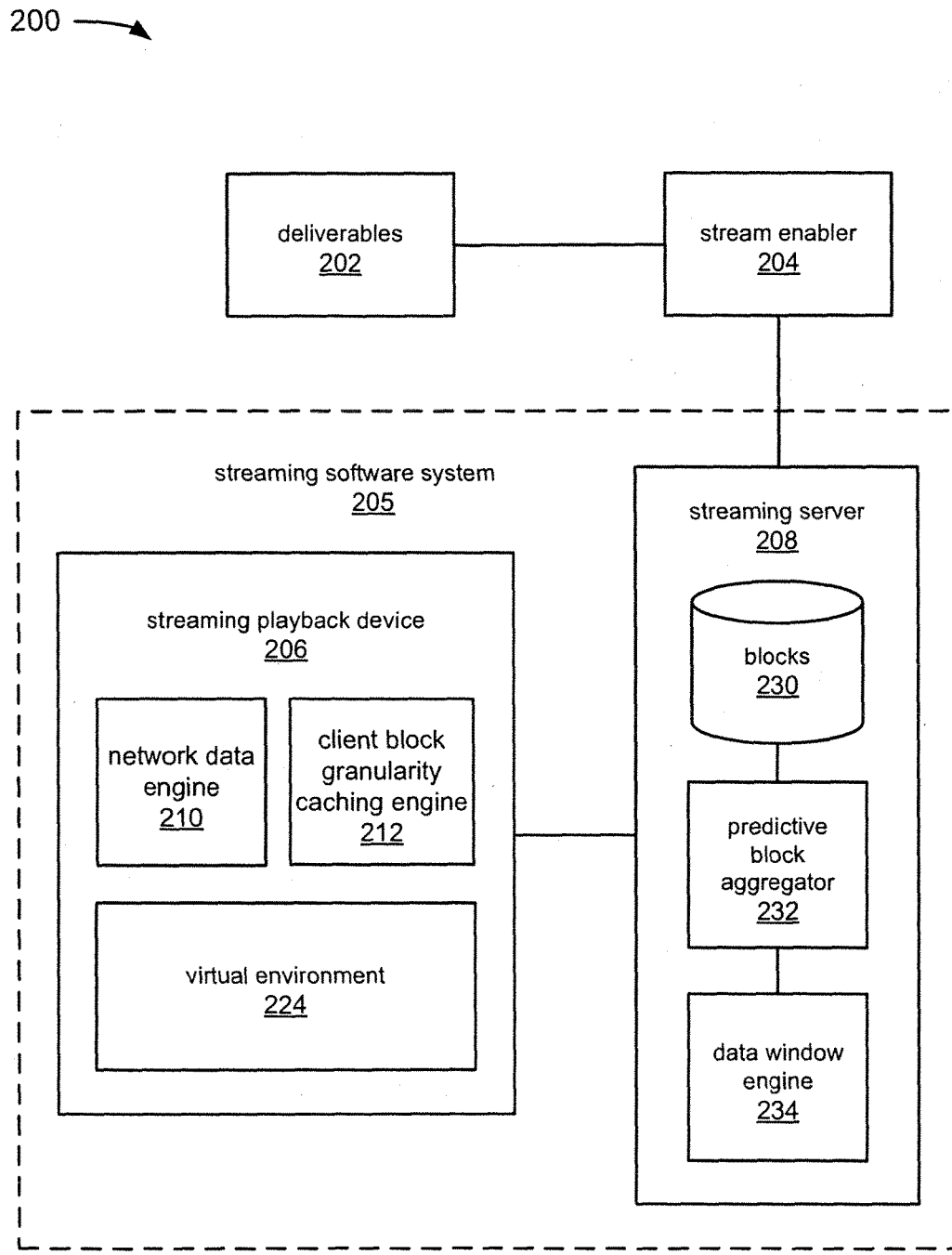
FIG. 2 depicts a diagram of an example of a system for efficiently transmitting blocks.

FIG. 2 depicts a diagram 200 of an example of a system for opportunistically transmitting blocks. FIG. 2 includes deliverables 202, stream enabler 204, and streaming software system 205.

In the example of FIG. 2, deliverables 202 may be deliverables of a non-stream enabled software application. The deliverables 202 may be the deliverables as discussed in reference to FIG. 1.

In the example of FIG. 2, stream enabler 204 may be hardware, software, or a combination of hardware and software. The stream enabler may be capable of taking deliverables of a non-stream enabled software application and breaking the deliverables up into blocks as discussed in reference to FIG. 1.

In the example of FIG. 2, streaming software system 205 includes streaming software playback device 206, and streaming server 208. In the example of FIG. 2, streaming playback device 205 includes network data engine 210, block granularity caching engine 212, and virtual environment 224.

In the example of FIG. 2, the block granularity caching engine 212 receives requested blocks as well as predictively streamed blocks from streaming server 208. Predictively streamed blocks may be blocks that were not requested, but were instead predicted to be needed by a stream enabled application executing in the virtual environment 224. Predictively streamed blocks may be stored in a local cache until needed. When predictively streamed blocks are needed resources included in the predictively streamed blocks may be accessed without requesting the blocks from streaming server 208.

In the example of FIG. 2, network data engine 210 may transmit and receive information associated with network latency and throughput to streaming server 208. It may be necessary for the network data engine 210 to receive a packet of information that includes a header having a timestamp, but no data. As will be discussed in reference to FIG. 8, packets may be transmitted and received in order to determine and update network latency information. Similarly the network data engine 210 may transmit data to the streaming server 208 to determine throughput.

In the example of FIG. 2, the virtual environment 224 may allow a stream-enabled application to execute. The virtualized execution environment 224 is a virtualized operating system enabling a streamed application to execute on a streaming playback device. A virtualized execution environment is discussed in U.S. patent application Ser. No. 09/098,095 entitled "METHOD AND APPARATUS TO ALLOW REMOTELY LOCATED COMPUTER PROGRAMS AND/OR DATA TO BE ACCESSED ON A LOCAL COMPUTER IN A SECURE, TIME-LIMITED MANNER, WITH PERSISTENT CACHING," which is incorporated by reference.

In the example of FIG. 2, streaming server 208 includes blocks 230, predictive block aggregator 232, and data window engine 234.

In the example of FIG. 2, the blocks 230 are blocks of a stream-enabled application. Blocks 230 may be included in a local storage, a database, or may be included in a non-local storage or a non-local database. A database may be a database, may be a file, or may be any known or convenient manner of storing data.

In the example of FIG. 2, the predictive block aggregator 232 may prioritize a number of blocks in order of likelihood of use by the streaming playback device 206. The predictive block aggregator 232 may add a number of blocks to a buffer in order of priority. The priority of the blocks may be determined as discussed in reference to FIG. 7A-B. Blocks may be added to the buffer until the buffer has reached a data window size.

In the example of FIG. 2, the data window engine 234 sets a data window size by considering the interactivity threshold of the stream-enabled application, the network latency, and the network throughput. Network latency and network throughput information may be considered on a continuously updated basis, may be infrequently updated, may be set only once, or may be disregarded. The interactivity threshold may be used in reference to the latency and throughput, or may be used independent of that information. The data window size may be used to limit the size of the buffer filled with predictively streamed blocks. In a non-limiting example, the predictively streamed blocks are limited to 10 k and blocks are set to 512 bytes. 20 predicted blocks are placed in the buffer, and the blocks are transmitted.

In the example of FIG. 2, in operation, the deliverables 202 are received by the stream enabler 204 and broken up into blocks and provided to streaming server 208 and stored in blocks 230. The network data engine 210 sends a request for a block to the streaming server 208 and the data window engine 234 calculates a data window. The predictive block aggregator 232 prioritizes the blocks 230 and places a number of the blocks 230 into a buffer up to the data window size set by the data window engine 234. The blocks in the buffer are transmitted to the streaming playback device 206 as predictively streamed blocks. The block granularity caching engine 212 stores the predictively streamed blocks in to a local cache. An application executing in the virtual environment 224 requests a resource, and the resource is at least partially satisfied from the blocks in the predictively streamed blocks in the cache.

Figure 3:
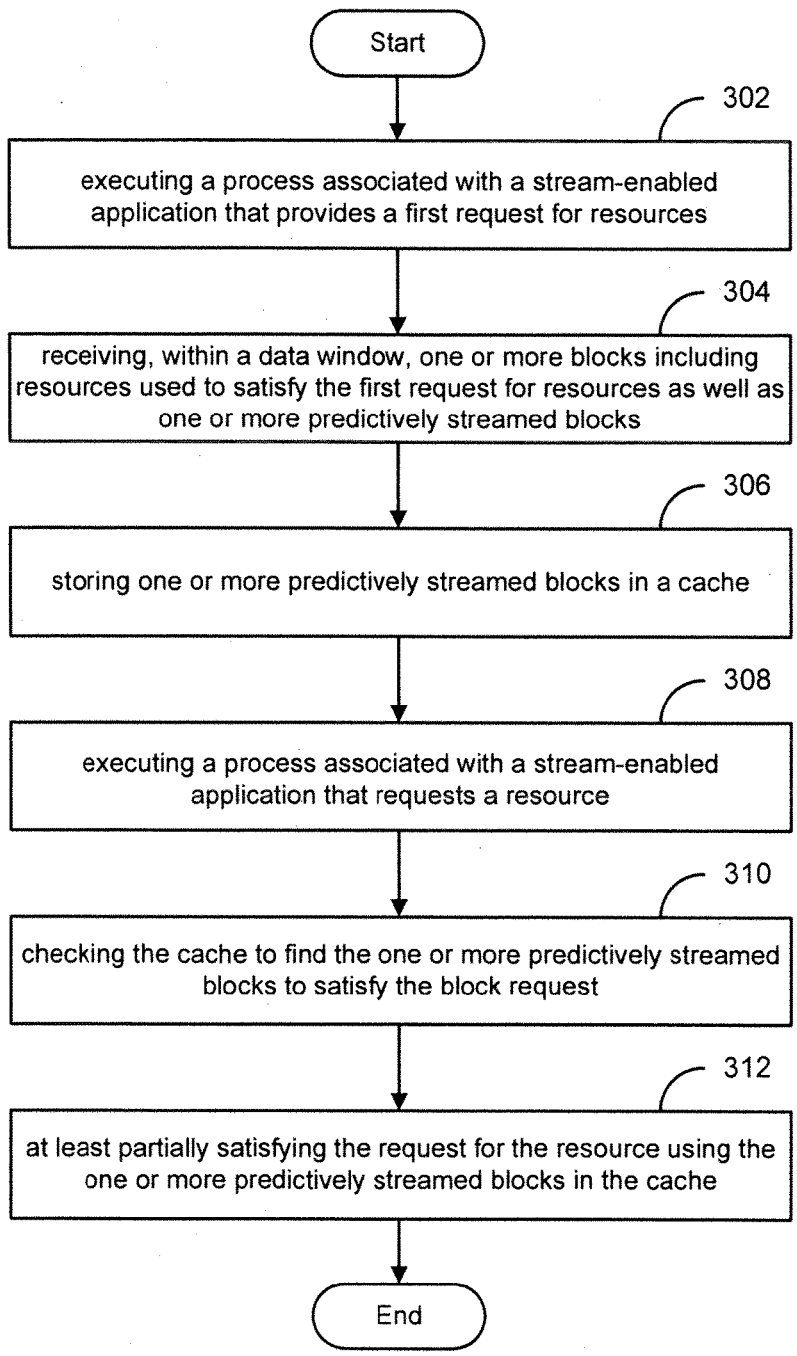
FIG. 3 depicts a flowchart of an example of a method for efficiently transmitting blocks.

FIG. 3 depicts a flowchart 300 of an example of a method for opportunistically transmitting blocks. The method is organized as a sequence of modules in the flowchart 300. However, it should be understood that these and modules associated with other methods described herein may be reordered for parallel execution or into different sequences of modules.

In the example of FIG. 3, the flowchart 300 starts at module 302 with executing a process associated with a stream-enabled application that provides a first request for resources. The resource may be needed for execution of a stream enabled application within a virtualized execution environment. The resources may be included in blocks of a stream enabled application stored locally or remotely on a streaming system.

In the example of FIG. 3, the flowchart 300 continues to module 304 with receiving, within a data window, one or more blocks including resources used to satisfy the first request for resources as well as one or more predictively streamed blocks. The data window may limit the number of predictively streamed blocks that may be transmitted. The resources in the one or more blocks may be used to satisfy the first request for resources. The predictively streamed blocks may be associated with a probability of being requested by the stream enabled application in the future.

In the example of FIG. 3, the flowchart 300 continues to module 306 with storing one or more predictively streamed blocks in a cache. The blocks may be blocks that include resources that have a high likelihood of being used by the stream enabled application for a subsequent request for resources. A streaming system may predictively stream the blocks in advance of the stream enabled application requesting resources included in the blocks.

In the example of FIG. 3, the flowchart 300 continues to module 308 with providing a second request for resources. The second request for resources may be associated with one or more blocks that were predictively streamed in advance of the second request for resources.

In the example of FIG. 3, the flowchart 300 continues to module 310 with checking the cache to find the one or more predictively streamed blocks to satisfy the block request. If blocks including the resource were predictively streamed in advance, the resource may be found in blocks in the cache. However, blocks including the resource may not have been predictively streamed, or may have gone unused for a sufficient amount of time for the blocks to have been replaced with other blocks that have been more recently predictively streamed.

In the example of FIG. 3, the flowchart 300 continues to module 312 with at least partially satisfying the request for the resource using the one or more predictively streamed blocks in the cache. In some cases the resource may be spread across more than one block. One or more blocks including the resource may not be in the cache when needed. Blocks not found in the cache must be requested so that all blocks necessary are available so that the resource may be provided. In the case that the resource is entirely included in blocks in the cache, the entire resource is produced from the blocks in the cache, and the resource request is satisfied. Having satisfied the request for the resource, the flowchart terminates.

Figure 4:
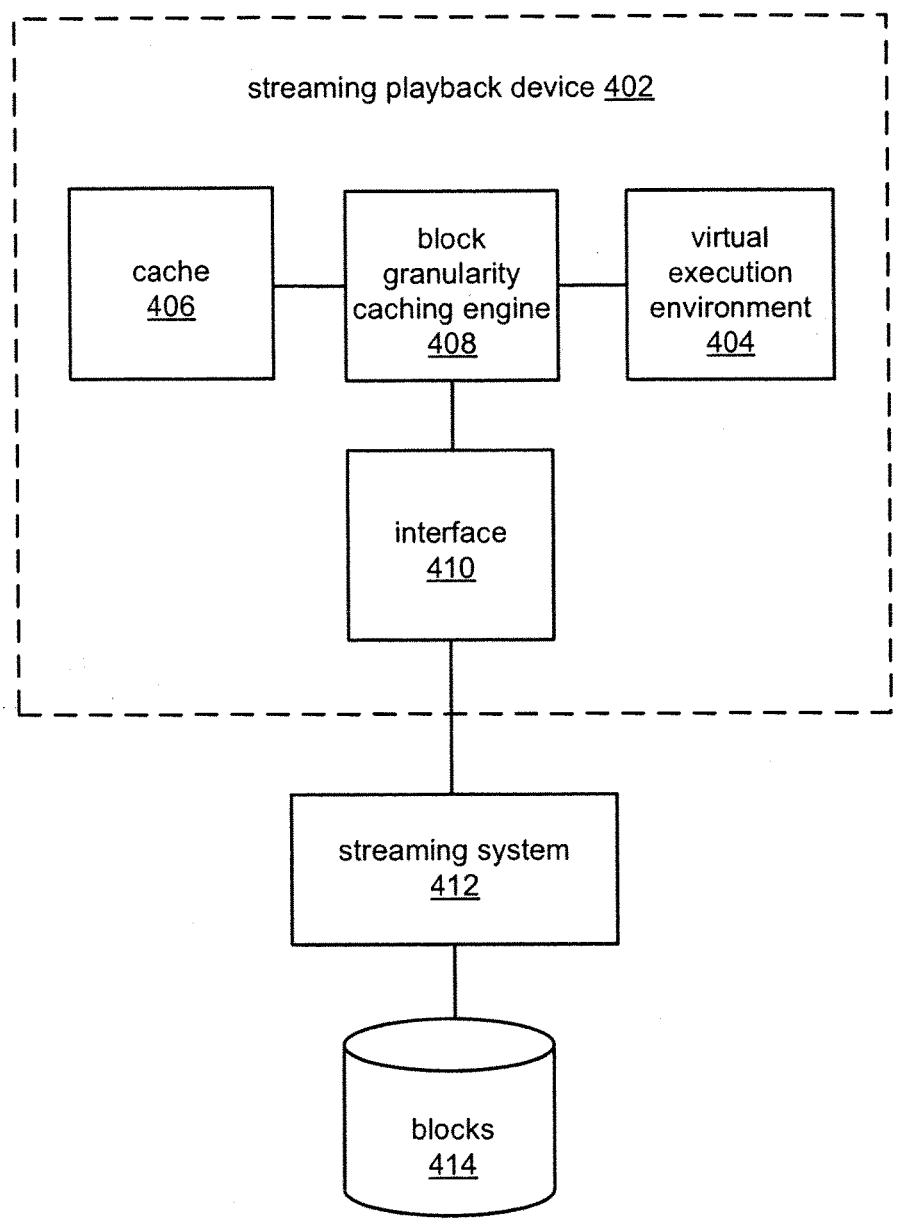
FIG. 4 depicts a diagram of an example of a streaming playback device receiving blocks.

FIG. 4 depicts a diagram 400 of an example of a streaming playback device receiving blocks. FIG. 4 includes streaming playback device 402, streaming system 412, and blocks 414.

In the example of FIG. 4, the streaming playback device 402 includes virtual environment 404, cache 406, block granularity caching engine 408, and interface 410.

In the example of FIG. 4, the virtual environment 404 may be a virtualized operating system enabling a streamed application to execute on a computing device as discussed in reference to FIG. 2.

In the example of FIG. 4, the cache 406 may store one or more blocks, the blocks including one or more resources. Blocks may be stored in a last-in-first-out (LIFO), associative cache, or any caching system known or convenient. Blocks that are used may be maintained in the cache 406 while blocks that are not used may be replaced by more recent predictively streamed blocks.

In the example of FIG. 4, the block granularity caching engine 408 may receive predicted blocks as they are transmitted to the streaming playback device 402. The blocks may be stored in the cache 406 by the block granularity caching engine 408. The block granularity caching engine 408 may intercept block requests from the virtual execution environment 404, and inspect the cache 406 to determine if some, all or none of the blocks are found in the cache 406. If some of the blocks are found in the cache 406, then the block granularity caching engine 408 may create a modified block request including a request for blocks that were requested by the virtual execution environment 404, but not found in the cache 406. If none of the blocks are found in the cache 406, the block granularity caching engine 408 may create a block request for all blocks requested by the virtual execution environment 404. If all of the blocks are found in the cache, the block granularity caching engine 408 may provide all blocks requested directly to the virtual execution environment 404, and may refrain from transmitting any request for blocks.

In the example of FIG. 4, the interface 410 may provide block requests to the streaming system 412. The interface 410 may receive blocks from the streaming system 412 and provide the blocks to the block granularity caching engine 408. An interface should be afforded a broad enough interpretation to include a bus within a single computing system, a wireless or wired connection between computing systems, or any known or convenient manner of transmitting blocks of a stream enabled application. The interface could be an input/output device, for reading a fixed media such as a CD-ROM, DVD-ROM, or other computer readable media.

In the example of FIG. 4, the streaming system 412 may be a separate computing device from streaming playback device 402, may be a fixed media from which a stream-enabled application is read, or may be any source of a stream enabled application. The streaming system 412 may include the blocks 414, or may be coupled to a computing device including the blocks 414. In the case of a fixed media, the streaming playback device 402 reads blocks from the input output device such as a CD-ROM, DVD-ROM, or other known or convenient computer readable medium.

In the example of FIG. 4, the blocks 414 may include blocks of a stream enabled application. Blocks 414 may be a file, a group of files, a database, a data store, or any manner known or convenient of storing a stream enabled application.

In the example of FIG. 4, in operation, a stream enabled application executing within the virtual execution environment 404 may request, for example, a resource in terms of a file offset and length. The virtual execution environment 404 may interpret the resource request as block 7. The block granularity caching engine 408 may then inspect the cache 406 to determine whether the requested block 7 is in the cache or not. If the requested block 7 is in the cache, then the block granularity caching engine 408 may provide the requested block to the virtual execution environment 404. If the requested block is not in the cache 406 then the block granularity caching engine 408 may then request the block 7 from the streaming system 412. The streaming system 412 may reply with block 7 and perhaps, by way of example, but not limitation, additional predictive blocks 7, 8, & 9. The additional blocks 8 and 9 may have a high likelihood of being needed after block 7 is requested. The block granularity caching engine 408 may provide the requested block 7 to the virtual execution environment 404, and may cache the predictively streamed blocks 8 and 9, as well as the requested block 7. The resources in the requested block 7 may be provided by the virtual execution environment 404 to the stream enabled application in terms of a file, offset and length.

Figure 5:
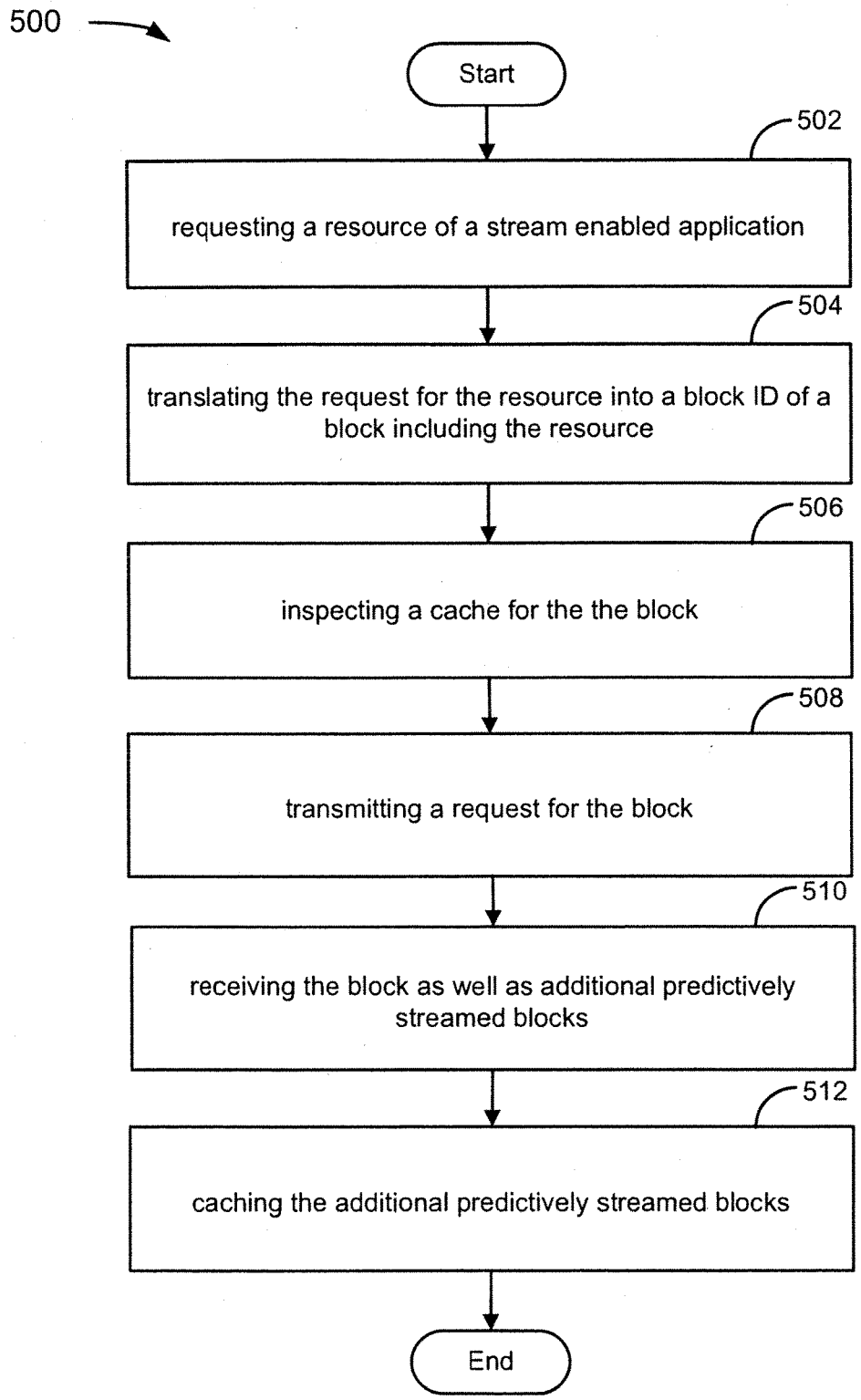
FIG. 5 depicts a flowchart of an example of a method for receiving blocks.

FIG. 5 depicts a flowchart 500 of an example of a method for receiving blocks. The method is organized as a sequence of modules in the flowchart 500. However, it should be understood that these and modules associated with other methods described herein may be reordered for parallel execution or into different sequences of modules.

In the example of FIG. 5, the flowchart 500 starts at module 502 with requesting a resource of a stream enabled application. A stream enabled application may request the resource in terms of a file, offset and length.

In the example of FIG. 5, the flowchart 500 continues to module 504 with translating the request for the resource into a block ID of a block including the resource. The resource may be included in a block, or may be spread across one or more blocks. The translation may thus include a plurality of blocks or merely a single block.

In the example of FIG. 5, the flowchart 500 continues to module 506 with inspecting a cache for the block. It may be that the block has been previously received, and is stored in cache. The block may have been previously requested, or may have been predictively streamed because it was likely that the resource included in the block would be requested. If a block is present, then the block is locked, or otherwise prevented from being deleted until the resource request is responded to. A locked block may be unlocked after the resource request is responded to.

In the example of FIG. 5, the flowchart 500 continues to module 508 with transmitting a request for the block. If the block was not found in the cache it may be necessary to request the block.

In the example of FIG. 5, the flowchart 500 continues to module 510 with receiving the block as well as additional predictively streamed blocks. In the case that one or more blocks are likely to be requested after the block, predictively streamed blocks may be transmitted along with the block, taking into consideration, a window for transmission based on the amount of time that a user may be willing to wait as well as the amount of data that may be transmitted in the time.

In the example of FIG. 5, the flowchart 500 continues to module 512 with caching the additional predictively streamed blocks. These additional predictively streamed blocks may be stored for future use. Blocks in the cache that are not needed may be replaced by predictively streamed blocks. Any locked blocks may not be replaced by additional predictively streamed blocks. Having cached the additional predictively streamed blocks, the flowchart terminates.

Figure 6:
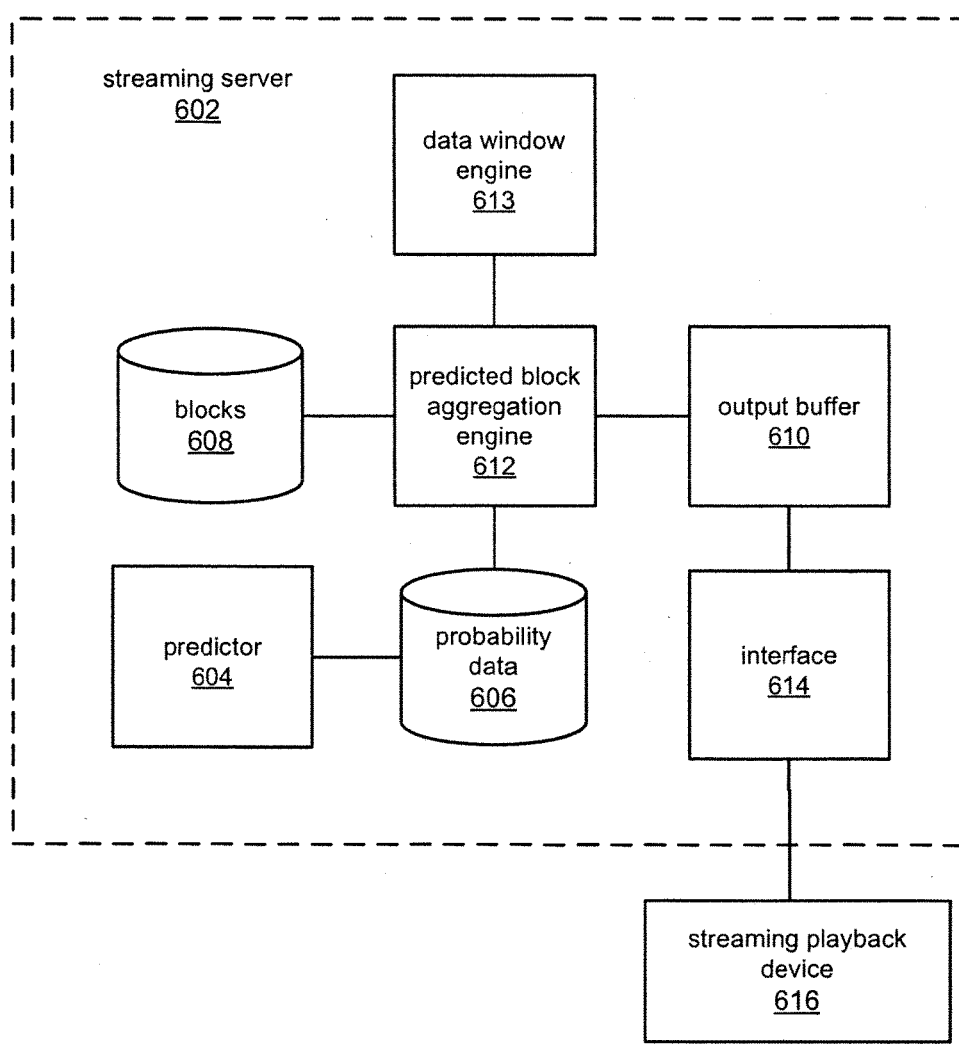
FIG. 6 depicts a diagram of an example of a streaming server transmitting blocks.

FIG. 6 depicts a diagram 600 of an example of a streaming server transmitting blocks. FIG. 6 includes streaming server 602, and streaming playback device 616.

In the example of FIG. 6, streaming server 602 includes predictor 604, blocks 608, predicted block aggregation engine 612, output buffer 610, and interface 614.

In the example of FIG. 6, the predictor 604 determines a likelihood of blocks being requested. The predictor creates probability data. The predictor is discussed in more depth in U.S. patent application Ser. No. 10/988,014 entitled "SYSTEM AND METHOD FOR PREDICTIVE STREAMING" by Jeffrey de Vries, incorporated herein by reference.

Figure 7:
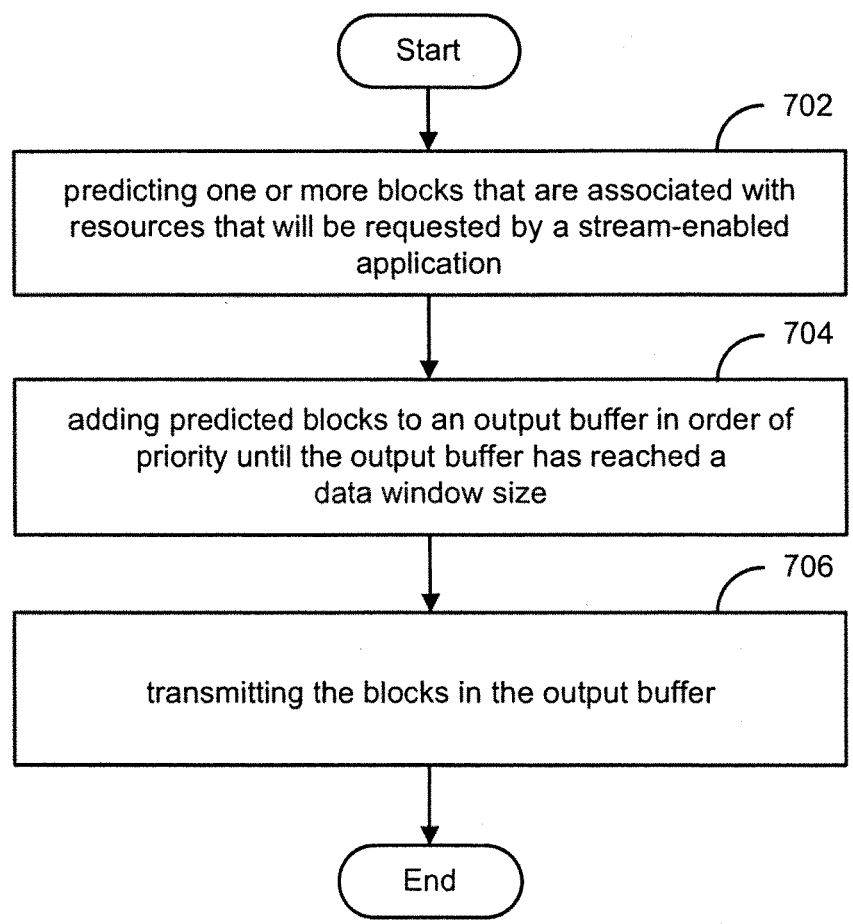
FIG. 7 depicts a flowchart of an example of a method for transmitting blocks.

In the example of FIG. 6, the probability data 606 includes probabilities of blocks being requested after blocks that have already been requested, such as is discussed in reference to FIG. 7. The probability data may be expressed as a logical block probability table, as a data store of probabilities, or in any manner known or convenient.

In the example of FIG. 6, the output buffer 610 may be any computer readable medium capable of storing data. The output buffer 610 may be volatile, or non-volatile. In a non-limiting example, the output buffer may include random access memory. The output buffer 610 may store blocks prior to transmission.

In the example of FIG. 6, the predicted block aggregation engine 612 includes functionality to fill an output buffer with blocks from blocks 608 based on block probability data 606. The predictive block aggregation engine 612 may add blocks to the output buffer up to a limit set by a data window size as discussed in reference to FIG. 7. The data window size may be limited by user responsiveness requirements and a maximum throughput between interface 614 and streaming playback device 616. An engine normally includes a processor and memory including instructions for execution by the processor.

Notably, below, two examples are provided of pseudo code that could be implemented to fill the output buffer 610 with blocks. However, neither the first example, nor the second example are limiting. Any known or convenient manner of filling the output buffer 610 with blocks may be used.

In a non-limiting example, the predicted block aggregation engine 612 may implement a priority queue to fill the output buffer with blocks. Consider a priority queue PQ. PQ contains tuples (pq,bq) each containing a probability (pq) and a block number (bq). The priority queue may be ordered by probability. A minimum probability tuple may always sit at the top of the queue. Initially PQ is empty. Q may be a working queue of tuples (pw,bw) each containing a probability (pw) and a block number (bw). PROB may be an indexed probability table 606 storing a probability of needing a predicted block having seen one or more previous blocks. The probability may be set in the range of 0-1. Let N be the max number of blocks that you can put into the output buffer=data window size/block size.

In continuing the non-limiting example, the following pseudo-code could be implemented to fill an output buffer with predicted blocks up to a maximum data window:

```
PUSH (1.0, requested block) onto working queue Q
WHILE working queue Q is not empty DO
   POP (pw,bw) with probability pw and block number bw from working queue Q
   IF (PQ.size = N) (i.e. PQ already has N entries) DO
      IF (pw <= PQ.min (i.e. the min probability at the top of the PQ)) DO
         CONTINUE back at the WHILE (i.e. skip this block)
      END IF
      IF (PQ already contains an entry for block number bw) DO
         IF (the probability in the entry for block bw in PQ >= pw) DO
            CONTINUE back at the WHILE (i.e. keep existing entry)
         ELSE
            REMOVE the entry for block bw from PQ
         END IF
      END IF
   END IF
   PUSH (pw, bw) onto priority queue PQ (updating the min entry as necessary)
   FOR EACH predicted block by for which PROB [bw][bp] > 0 DO
   PUSH (pw * PROB[bw][bp], bp) onto working queue Q
   END FOR LOOP
END WHILE LOOP
FOR EACH block in the priority queue DO
   go read the block data and put the block number and the block data into the
output buffer
END FOR LOOP
SEND output buffer containing requested block + top N-1 blocks based on probability
```

Notably, one could use as many stages of look ahead as is desirable. One could have PROB[seen1][seen2] . . . [seen n] [predicted block]=the probability of seeing the predicted block give the sequence of previously seen blocks seen 1 . . . seen n. The additional stages of look ahead may provide better focused predictions of blocks. In another non-limiting example, the following pseudo code could be implemented to fill the output buffer with blocks. Q is a working queue of (probability, block number) tuples, sorted by order of decreasing probability, initially empty. Let probability table be same as discussed above relative to the first example.

```
PUSH (1.0, requested block) onto working queue Q
WHILE working queue Q is not empty AND output buffer is not full DO
   POP (pw,bw) with probability pw and block number bw from working queue Q
   IF output buffer doesn't already contain block bw
      ADD block number bw and data for block bw to output buffer
   END IF
   FOR EACH predicted block by for which PROB[bw][bp] > 0 DO
      IF output buffer doesn't already contain block by
         INSERT (pw * PROB[bw][bp], bp), sorted by decreasing probability, into
working queue Q
      END IF
   END FOR LOOP
END WHILE LOOP
SEND output buffer
```

In the example of FIG. 6, the data window engine 613 sets a data window size by considering the interactivity threshold of the stream-enabled application, the network latency, and the network throughput. Network latency and network throughput information may be considered on a continuously updated basis, may be infrequently updated, may be set only once, or may be disregarded. The interactivity threshold may be used in reference to the latency and throughput, or may be used independent of that information. The data window size may be used to limit the size of the buffer filled with predictively streamed blocks.

Figure 9:
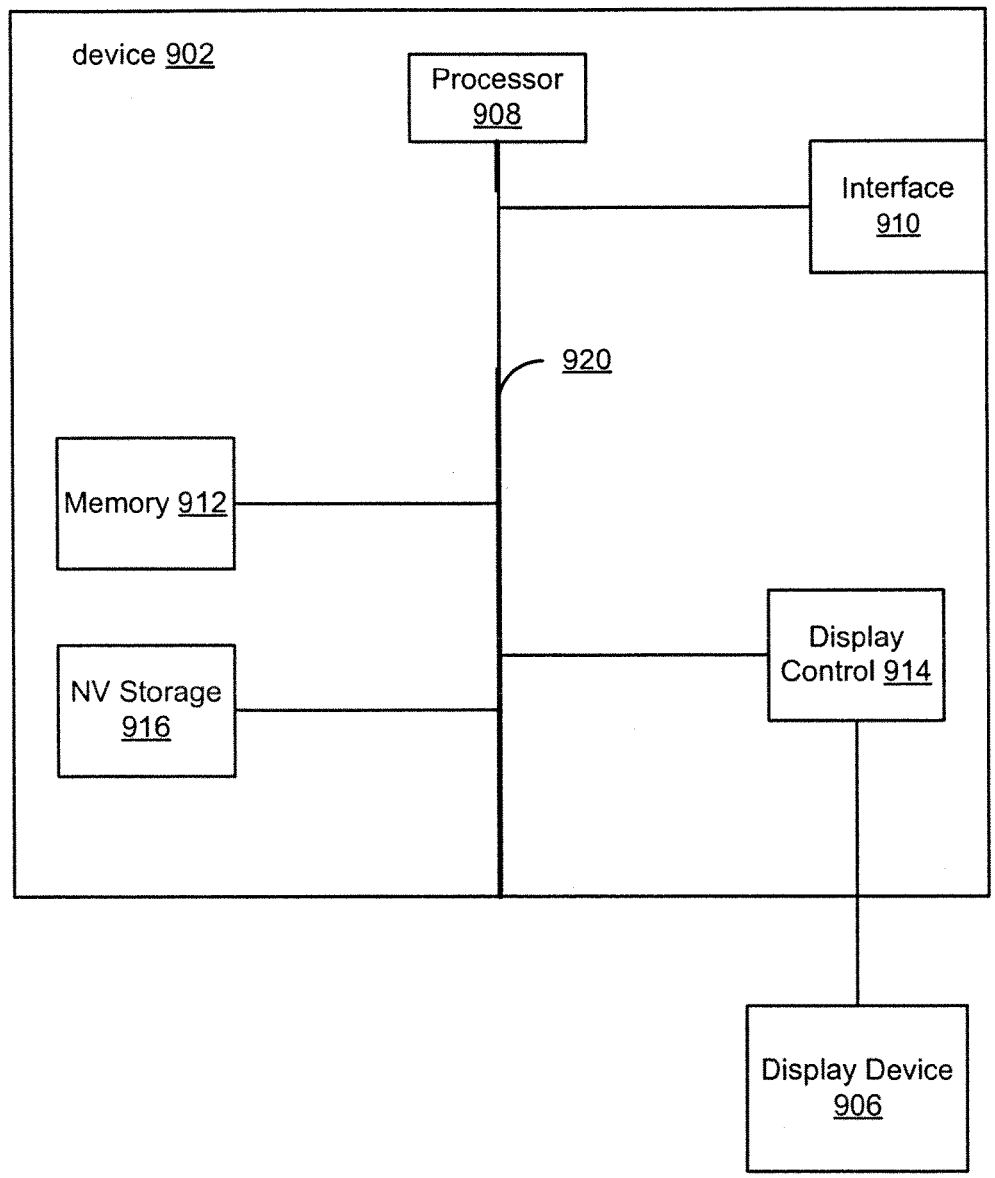
FIG. 9 depicts a diagram of an example of a device for streaming software.

In the example of FIG. 6, the interface 614 may be an interface as discussed in reference to FIG. 9. It should be appreciated that the interface may be interpreted broadly enough to include connections within a single computing system. Additionally, the interface may any means of transmitting data, e.g., optical network, Ethernet, or any means known or convenient.

In the example of FIG. 6, the streaming playback device 616 may include a virtualized environment for a stream enabled application. Streaming playback device 616 may include a processor, non-volatile memory, and an interface. The streaming playback device 616 may include a virtual execution environment executing a stream enabled application that requests resources. A resource request may be translated into a block request.

In the example of FIG. 6, in operation, the streaming playback device 616 creates a request for a block. The request is provided to streaming server 602. The predictor 604 predicts a number of blocks that are likely to be requested after the block and stores the predictions in probability data 606. Predicted block aggregation engine 612 identifies the blocks in probability data 606 that are likely to be requested after the block, and adds zero or more blocks from the blocks 608 until the output buffer 610 has reached a data window size. Once the output buffer 610 has reached the data window size, the output buffer is provided, via the interface 614, to the streaming playback device 616.

FIG. 7 depicts a flowchart 700 of an example of a method for transmitting blocks. The method is organized as a sequence of modules in the flowchart 700. However, it should be understood that these and modules associated with other methods described herein may be reordered for parallel execution or into different sequences of modules.

In the example of FIG. 7, the flowchart 700 starts at module 702 with predicting one or more blocks that are associated with resources that will be requested by a stream-enabled application. As many stages of look ahead as is desirable may be used to provide predictions of future blocks. In a non-limiting example, given that the streaming playback device requested block 4, a predictor could predict that the next three blocks that will be requested by a streaming playback device will be, in order of probability, 7, 15, and 24.

In the example of FIG. 7, the flowchart 700 continues to module 704 with adding predicted blocks to an output buffer in order of priority until an output buffer has reached the data window size. The blocks may be added in priority, by likelihood of being requested, or by any known or convenient manner. In a non-limiting example, the blocks added may begin with the block requested followed by the block most likely be requested, until the maximum, e.g., 32K of blocks have been added to the buffer.

In the example of FIG. 7, the flowchart 700 continues to module 706 with transmitting the blocks in the output buffer. The blocks in the buffer are provided to the streaming software client. Having transmitted the blocks in the output buffer, the flowchart terminates.

FIG. 8 depicts a diagram 800A of an example of a logical expression of a block probability table and a diagram 800B of an example of partially filled response buffer.

In the example of FIG. 8, the diagram 800A includes probabilities of a streaming playback device requesting blocks. Each row of this table includes the probability of each block being needed after this block. Diagonally square (7,7), through square (13,13) include no probabilities as such would calculate the probability of a block being requested immediately after the block, itself, is requested. In the example of FIG. 8, for example, the probability of block 11 being requested after block 7 is 0.1, or 10%. In a non-limiting example, this might be because block 8 is only used by the streamed application when an error condition occurs, and that error condition only occurs about 10% of the time, e.g., a misspelled file name.

In the example of FIG. 8, the diagram 800B includes the partially filled response buffer storing a requested block as well as a plurality of predicted blocks. It may not be necessary or possible to fill the response buffer completely with blocks. In a non-limiting example, if block 7 is requested, and no blocks are predicted to follow block 7, then it may not be possible to fill a 10-block-long output buffer because there are not enough blocks to send.

In determining a data window size, the following non-limiting examples an interactive threshold may be calculated, however, any known or convenient method of calculating a data window size may be used. The following non-limiting examples are provided for clarity.

In a non-limiting example of a method for calculating a data window size MAX_WINDOW may be an upper limit of the largest amount of data that the response buffer may hold. Throughput may be a value representing the amount of data per unit of time that may be transmitted on a network connecting a streaming server with a streaming playback device. The data window size may thus be calculated: data window=MIM[MAXIMUM_WINDOW, throughput*interactive threshold].

In a non-limiting example, an interactive threshold is a limit on the amount of time that an individual may be willing to wait for a block. A latency may be a time delay between deciding to transmit a block and transmitting the first bit of the block. A throughput may be a value representing the amount of data per unit of time that may be transmitted on a network connecting a streaming server with a streaming playback device. The data window size may thus be calculated: data window=(interactive threshold−round trip latency)*throughput.

In a non-limiting example a MIN_WINDOW_SIZE may be a lower limit of the smallest amount of data that the response buffer may hold. An interactive threshold and a latency may be as described above. The data window may be thus calculated data window=MAX [MIN_WINDOW_SIZE, (interactive threshold−(round trip latency))*throughput].

Any manner of determining a latency known or convenient may be used. Latency may be important because an interactive threshold is decreased by subtracting a latency from the time allowed for the interactive threshold. Any manner of determining a latency known or convenient may be used. Latency may be continuously recalculated throughout a streaming session so as to provide an accurate data window size.

Throughput may be dynamically determined by, at the beginning of the session, sending test buffers between a server and a client. The throughput may be calculated, based on the time required to transmit the buffers, and the data size of the buffers. The throughput could be run through a low pass filter to obtain an average throughput, to get a constant updated throughput. If something in the network switches routes, then we may adapt our window size. Alternatively, any manner of determining a throughput known or convenient may be used.

FIG. 9 depicts a diagram 900 of an example of a device for streaming software. The computing system 900 may be a computing system that can be used as a client computing system, such as a wireless client or a workstation, or a server computing system. The computing system 900 includes a computer 902, and a display device 906. The computer 902 includes a processor 908, interface 910, memory 912, display controller 914, and non-volatile storage 916. The computer 902 may be coupled to or include display device 906.

The computer 902 interfaces to external systems through the interface 910, which may include a modem, network interface, CD-ROM drive, DVD-ROM drive, or any known or convenient interface. An interface may include one or more input-output devices. Interface 910 may include one or more interfaces. An interface may include a device for reading a fixed media. An interface may receive deliverables. An interface may transmit a stream-enabled application. It will be appreciated that the interface 910 can be considered to be part of the computing system 900 or a part of the computer 902. The interface 910 can be an analog modem, ISDN modem, cable modem, token ring interface, satellite transmission interface (e.g. "direct PC"), or other interface for coupling a computing system to other computing systems.

The processor 908 may be, for example, a microprocessor such as an Intel Pentium microprocessor or Motorola power PC microprocessor. The memory 912 is coupled to the processor 908 by a bus 920. The memory 912 can be Dynamic Random Access Memory (DRAM) and can also include Static RAM (SRAM). The bus 920 couples the processor 908 to the memory 912, also to the non-volatile storage 916, and to the display controller 914.

The non-volatile storage 916 is often a magnetic hard disk, an optical disk, or another form of storage for large amounts of data. Some of this data is often written, by a direct memory access process, into memory 912 during execution of software in the computer 902. One of skill in the art will immediately recognize that the terms "machine-readable medium" or "computer-readable medium" includes any type of storage device that is accessible by the processor 908 and also encompasses a carrier wave that encodes a data signal.

The computing system 900 is one example of many possible computing systems which have different architectures. For example, personal computers based on an Intel microprocessor often have multiple buses, one of which can be an I/O bus for the peripherals and one that directly connects the processor 908 and the memory 912 (often referred to as a memory bus). The buses are connected together through bridge components that perform any necessary translation due to differing bus protocols.

Network computers are another type of computing system that can be used in conjunction with the teachings provided herein. Network computers do not usually include a hard disk or other mass storage, and the executable programs are loaded from a network connection into the memory 912 for execution by the processor 908. A Web TV system, which is known in the art, is also considered to be a computing system, but it may lack some of the features shown in FIG. 9, such as certain input or output devices. A typical computing system will usually include at least a processor, memory, and a bus coupling the memory to the processor.

In addition, the computing system 900 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 916 and causes the processor 908 to execute the various acts required by the operating system to input and output data and to store data in memory, including storing files on the non-volatile storage 916.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantifies take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

The teachings included herein also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memory (ROM), random access memory (RAM), EPROM, EEPROM, magnetic or optical cards, any type of disk including floppy disks, optical disks, CD-ROMs, and magnetic-optical disks, or any type of media suitable for storing electronic instructions, and each coupled to a computing system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, there is no reference to any particular programming language, and various examples may be implemented using a variety of programming languages.

It will be appreciated to those skilled in the art that the preceding examples and embodiments are exemplary and not limiting in scope. It is intended that all permutations, enhancements, equivalents, and improvements thereto that are apparent to those skilled in the art upon a reading of the specification and a study of the drawings are included within the true spirit and scope of these teachings. It is therefore intended that the following appended claims include all such modifications, permutations, and equivalents as fall within the true spirit and scope of these teachings.

What is claimed is:

1. A method comprising:
   receiving a request, from a streaming playback device, for a block of a stream-enabled application virtualized at a client device by the streaming playback device;
   determining likelihoods of additional blocks of the stream-enabled application being requested based on an identification of the block of the stream-enabled application using probability data;
   generating an output buffer that includes the block of the stream-enabled application;
   adding at least a portion of the additional bocks of the stream-enabled application to the output buffer based on the likelihoods of the additional blocks of the stream-enabled application being requested and a data window size of the output buffer, the data window size of the output buffer varied based on user responsiveness requirements to control a number of the additional blocks of the stream-enabled application added to the output buffer while still meeting the user responsive requirements in executing the stream-enabled application virtualized at the client device using the block of the stream-enabled application;
   providing the output buffer to the streaming playback device.

2. The method of claim 1, wherein the data window size is based on a maximum throughput with the streaming playback device.

3. The method of claim 1, wherein the at least the portion of the additional blocks of the stream-enabled application are added to the output buffer in an order of decreasing likelihood that the additional blocks of the stream-enabled application will be requested.

4. The method of claim 1, wherein the probability data is a logical block probability table.

5. The method of claim 1, wherein the probability data is generated based on a probability that the at least the portion of the additional blocks of the stream-enabled application will be seen in a number of stages ahead of a current stage in virtualizing the stream-enabled application at a current stage using the block of the stream-enabled application.

6. The method of claim 1, wherein the user responsiveness requirements include an interactivity threshold that is a limit on an amount of time that an individual interacting with the streaming playback device can wait for the at least the portion of the additional blocks in virtualizing the stream-enabled application.

7. The method of claim 1, wherein the data window size is based on a maximum throughput with the streaming playback device and the maximum throughput is determined dynamically as the stream-enabled application is virtualized by the streaming playback device.

8. The method of claim 1, wherein the data window size is based on a maximum throughput with the streaming playback device and the maximum throughput is determined by running a throughput through a low pass filter to determine an average throughput, the average throughput used in determining the maximum throughput with the streaming playback device.

9. The method of claim 1, wherein the data window size is based on a maximum throughput with the streaming playback device and the maximum throughput is determined dynamically based on a latency with the streaming playback device.

10. A system comprising:
    an interface configured to receive a request, from a streaming playback device, for a block of a stream-enabled application virtualized at a client device by the streaming playback device;
    a predictor configured to determine likelihoods of additional blocks of the stream-enabled application being requested based on an identification of the block of the stream-enabled application using probability data;
    a predicted block aggregation engine configured to:
        generate an output buffer that includes the block of the stream-enabled application;
        add at least a portion of the additional bocks of the stream-enabled application to the output buffer based on the likelihoods of the additional blocks of the stream-enabled application being requested and a data window size of the output buffer, the data window size of the output buffer varied based on user responsiveness requirements to control a number of the additional blocks of the stream-enabled application added to the output buffer while still meeting the user responsive requirements in executing the stream-enabled application virtualized at the client device using the block of the stream-enabled application;
    the interface further configured to provide the output buffer to the streaming playback device.

11. The system of claim 10, wherein the data window size is based on a maximum throughput with the streaming playback device.

12. The system of claim 10, wherein the at least the portion of the additional blocks of the stream-enabled application are added to the output buffer in an order of decreasing likelihood that the additional blocks of the stream-enabled application will be requested.

13. The system of claim 10, wherein the probability data is a logical block probability table.

14. The system of claim 10, wherein the probability data is generated based on a probability that the at least the portion of the additional blocks of the stream-enabled application will be seen in a number of stages ahead of a current stage in virtualizing the stream-enabled application at a current stage using the block of the stream-enabled application.

15. The system of claim 10, wherein the user responsiveness requirements include an interactivity threshold that is a limit on an amount of time that an individual interacting with the streaming playback device can wait for the at least the portion of the additional blocks in virtualizing the stream-enabled application.

16. The system of claim 10, wherein the data window size is based on a maximum throughput with the streaming playback device and the maximum throughput is determined dynamically as the stream-enabled application is virtualized by the streaming playback device.

17. The system of claim 10, wherein the data window size is based on a maximum throughput with the streaming playback device and the maximum throughput is determined by running a throughput through a low pass filter to determine an average throughput, the average throughput used in determining the maximum throughput with the streaming playback device.

18. The system of claim 10, wherein the data window size is based on a maximum throughput with the streaming playback device and the maximum throughput is determined dynamically based on a latency with the streaming playback device.

* * * * *